US011868292B1

(12) United States Patent
Vaskevich et al.

(10) Patent No.: US 11,868,292 B1
(45) Date of Patent: Jan. 9, 2024

(54) PENALTY BASED ARBITRATION

(71) Applicant: Amazon Technologies, Inc., Seattle, WA (US)

(72) Inventors: Lev Vaskevich, Hertsliya (IL); Noam Katz, Tel Aviv-Jaffa (IL)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 17/656,710

(22) Filed: Mar. 28, 2022

(51) Int. Cl.
*G06F 13/366* (2006.01)
*G06F 9/50* (2006.01)

(52) U.S. Cl.
CPC .......... *G06F 13/366* (2013.01); *G06F 9/5033* (2013.01)

(58) Field of Classification Search
None
See application file for complete search history.

(56) References Cited

U.S. PATENT DOCUMENTS

| 10,067,796 | B1 * | 9/2018 | Metcalf | ................... G06F 12/12 |
| 11,310,164 | B1 * | 4/2022 | Korman | .............. H04L 47/6225 |
| 2007/0195777 | A1 * | 8/2007 | Tatar | ................... H04L 49/1546 |
| | | | | 370/469 |

* cited by examiner

*Primary Examiner* — Michael Sun
(74) *Attorney, Agent, or Firm* — Weaver Austin Villeneuve & Sampson LLP (57) ABSTRACT

A plurality of resource requesters may be configured to consume a resource to perform a task. Each of the plurality of resource requesters can be allocated a resource budget to consume the resource to perform the task. An arbiter can select one of the plurality of resource requesters to consume the resource based on an arbitration scheme. When a resource requester is selected, the amount of resource consumed by the resource requester can be deducted from its resource budget. When the resource requester is idle for a number of cycles when selected, the corresponding resource budget can be further reduced to account for the actual amount of resource consumed and wasted by the resource requester, which can provide fairness in resource consumption over few rounds of arbitration.

21 Claims, 5 Drawing Sheets

PENALTY BASED ARBITRATION

BACKGROUND

In computing systems, multiple resource requesters may compete for a shared resource. For example, multiple ports may feed packets into a single packet processor. The ports may have to compete for a processing slot to feed the packet processor. An arbiter can be used to resolve this competition by arbitrating between the ports based on an arbitration scheme and selecting the next port that can transmit its packet to the packet processor. Some examples of the arbitration schemes may include first-come first served, round-robin, Deficit Round Robin (DRR), Deficit Weighted Round Robin (DWRR), or Weighted Fair Queuing (WFQ).

BRIEF DESCRIPTION OF THE DRAWINGS

Various embodiments in accordance with the present disclosure will be described with reference to the drawings, in which.

DETAILED DESCRIPTION

Computing systems may include resources shared by multiple components. For example, in some computer network systems, multiple network ports may feed packets (e.g., Ethernet packets) into a packet processing pipeline (PPP). An arbiter can arbitrate between the ports to select the next port that can transmit its packet into the PPP. An arbitration scheme can be utilized to perform the port selection in a fair manner such that a single port does not consume all the resources. In some cases, selection of the port cannot be changed until an entire packet has been passed irrespective of the size of the packet.

Some systems may use a Deficit Weighted Round Robin (DWRR) algorithm to arbitrate between the ports. The DWRR algorithm may allocate a bandwidth budget to each port and arbitrate among the ports in a round-robin manner for each round of budget allocation. The DWRR algorithm may select a port to transmit a packet into the PPP by considering its corresponding budget in that round to balance the bandwidth allocated to each port and ensure that each port can get a minimum of its allocated bandwidth. Once a port is selected, the size of the packet is subtracted from the port's bandwidth budget after the port has finished transmitting the packet. Once each port has consumed its budget in the current round of budget allocation after transmitting one or more packets, new budget may be allocated for the next round of budget allocation.

In some examples, the bandwidth budget can be represented by a number of bytes that a given port is allocated for transmission in a single round of budget allocation based on its transmission rate. A port can be eligible for selection to transmit one or more packets in each round of budget allocation if its corresponding budget is more than a threshold. A port, when selected, may transmit a portion of the packet in each cycle based on the width of the data bus, which can be deducted from the bandwidth budget after the transmission. The port can continue transmitting until the end of the packet is reached. Once all the eligible ports have finished transmitting their packets in the current selection round, a new selection round can be performed, and the arbiter can arbitrate again among the ports. When the budget of all ports falls to or below the threshold, a new round of budget allocation is performed. As an example, if the data bus is 32 bytes wide, each port can transmit up to 32 bytes per cycle when selected. If the allocated budget is 64 bytes, and the threshold is set to 0 in this example, once the port starts transmitting, the budget can be decremented by 32 bytes every cycle. Thus, the budget may become 0 after 2 cycles of transmission. Once all the ports have depleted their respective budget to 0 (the threshold in this example), another 64 bytes can be allocated to each port for the next round of budget allocation.

In some examples, a port can be very slow, while another port can be very fast. When the slow port is selected first for transmission, it may take much longer to transmit a large packet to the PPP before the arbiter can select the fast port. In some examples, the entire packet may not be stored at the slow port, and therefore, only a partial packet may be available for transmission. In this case, while the slow port is waiting for the remaining packet to be available for the transmission, it may still occupy the transmission path. Thus, during the time the slow port is not transmitting any data and is idle, the transmission path cannot be used for any other data transfer, which can cause bubbles in the transmission. Since the fast port cannot be selected until the slow port has finished transmitting its packet, in some cases, the fast port may start dropping packets once the buffer in the fast port becomes full and can no longer store additional packets. In such cases, the time each port occupies the transmission path can become skewed between the ports due to these inequities. Generally, the DWWR algorithm does not account for any loss of bandwidth due to these bubbles, and therefore, a slow port can consume much more bandwidth than expected for its actual speed.

Some systems address the bubble issue by requiring each port to store the respective packets before it can compete for the processing slot. However, the store and forward solution may add significant latency to the packet since the packet has to be stored completely by the port's buffer before it can be transmitted. Thus, there is a need for an algorithm which can balance the overall bandwidth consumed by each port in a fair manner despite of the inequities in their transmission speeds.

The techniques disclosed herein can provide fairness in bandwidth consumption based on a modified DWRR arbitration scheme by penalizing the slow port to account for the wasted bandwidth. In some embodiments, the allocated budget for the port that is idle during the transmission of a packet can be further reduced to compensate for the wasted bandwidth corresponding to the bubbles. For example, when a port is causing bubbles in the transmission datapath while waiting for the data to be available for transmission, the allocated budget for that port can be further reduced for each cycle that the port is idle. In some cases, once that port has finished transmitting the packet, its budget may become lower than the threshold that is required to be eligible for transmission, which can make the port ineligible for selection to transmit another packet in the current round of budget allocation. When additional budget is allocated for the next round of budget allocation, the port that was idle earlier may still not have sufficient budget to be eligible for transmission, and thus may not get selected in the next round. Nevertheless, this may allow that port to accumulate enough data during the next round such that the port's buffer is filled before the subsequent round, and therefore, the overall bandwidth over subsequent rounds will be distributed fairly among the ports.

In some embodiments, a resource manager can manage the budgets for each port so that the ports which are idle while being selected can be penalized accordingly. As an example, each port can be associated with a corresponding budget counter which can be initialized with a byte count budget for that port. A port can be eligible for selection by an arbiter if its corresponding budget counter is more than a threshold. The arbiter may select a port from all the eligible ports to transmit one or more packets to a packet processor based on any suitable algorithm such as round-robin. The arbitration may be performed in a round-robin manner among the eligible ports in one or more selection rounds for each budget allocation round. For example, in some implementations, a port can stay selected until it exhausts its corresponding budget or becomes ineligible, and then the next port is selected. In such implementations, a port is selected at most one time in a budget allocation round. In other implementations, each eligible port is allowed to transmit one packet, and then the next eligible port is selected in a selection round. In such implementations, multiple selection rounds may take place until all the ports become ineligible in a budget allocation round. The budget counter for the selected port can be decremented by the number of bytes in each cycle that data for the packed is transmitted. In some embodiments, the resource manager can penalize a slow port by further decrementing the budget counter in each cycle the selected port is idle, which can further reduce the port's budget for transmission in the next round.

Once each port has finished transmitting one or more packets in the current round of budget allocation, the corresponding budget counter for each port can be incremented by the byte count budget for the next round of budget allocation. The arbiter can select a port from all the eligible ports which have the corresponding budget counter above the threshold. However, the port which was idle in the previous round may not be eligible in this round since the corresponding budget counter may be below the threshold. Thus, the wasted bandwidth by the slow port in the previous round can be balanced by not using any bandwidth in this round. Additionally, not being selected in this round can allow the slow port to accumulate sufficient data to reduce the likelihood that bubbles appear during packet transmission in the next round of budget allocation when the port becomes eligible again.

For example, for each bubble cycle that the selected port is not transmitting any data, the allocated budget can be reduced by the number of bytes that the port would have transmitted in that cycle. As an example, for a 32 bytes wide data bus, the budget can be decremented by 32 bytes every cycle to compensate for the wasted bandwidth. Thus, the budget can continue to be decremented and may result in the budget falling below the threshold based on the number of bubble cycles. Once the end of packet is received and transmitted to the packet processor, the slow port may become ineligible, and another eligible port can be selected for transmission. In some examples, if the slow port was waiting for a long time, the budget may be under the threshold by a large amount (e.g., a high negative number if the threshold is 0), and, therefore, it may take one or more budget allocation rounds before the slow port can be selected again by the arbiter. For example, the arbiter may assign a new budget to all the ports in each round, which may get added to the remaining budget (if any) from the last round. The slow port may be selected again after one or more rounds once it has accumulated enough budget for transmission. However, the longer it takes to get selected again, the higher the likelihood of accumulating enough data so it may not need to be penalized in the next few rounds.

Thus, the embodiments can provide a modified DWRR arbitration scheme to ensure that each port is accountable for the actual bandwidth it consumes and wastes. A port that may be idle for a longer duration while being selected may result in the budget falling below the threshold (e.g., a negative budget if the threshold is 0), which can make that port ineligible for a number of subsequent rounds of selection. However, this may cause the port to accumulate a larger portion of the packet before it tries to compete again for the processing slot at the packet processor. This system can reach an equilibrium where all the slow ports may have to store a portion of their packets that is large enough so that the wasted cycles can be minimized. On the other hand, faster ports may not be penalized by additional latency and can continue transmitting in a cut-through mode.

Some embodiments can be used to provide fair arbitration among different components of a system that are competing to access a shared memory. The components that take longer than their allocated budget to access the shared memory can be penalized to compensate for the wasted cycles. Some embodiments can be used to provide fair arbitration among multiple system-on-chips (SoCs) that may communicate with each other using a single transmission mechanism. Thus, the embodiments can be used to provide fair arbitration among multiple entities that are competing for a service/resource while taking into account any wastefulness or inefficiencies of the entities.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
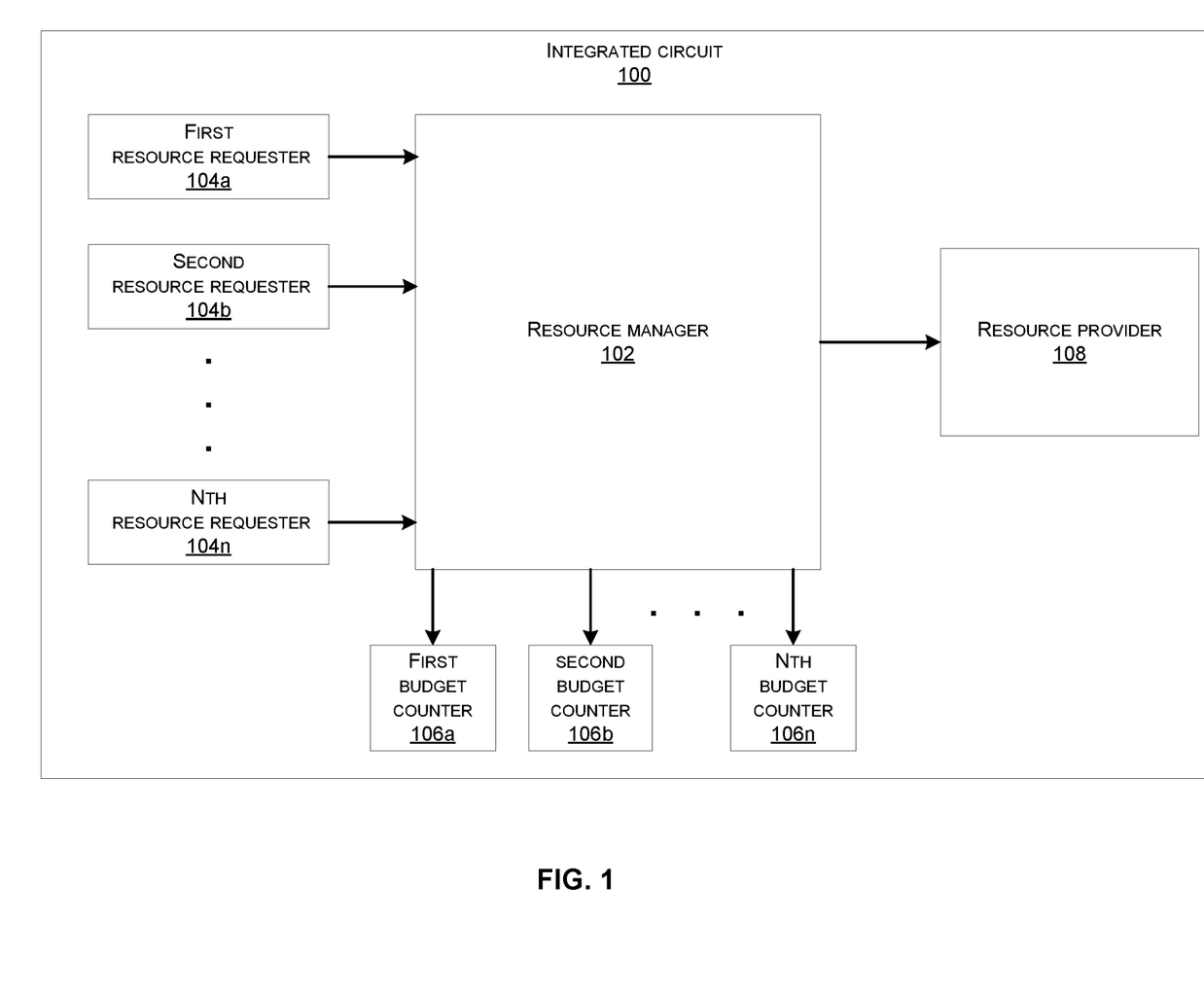
FIG. 1 shows an integrated circuit comprising a resource manager configured to arbitrate among a plurality of resource requesters to consume a resource in a fair manner based on a modified DWRR algorithm, according to some embodiments.

FIG. 1 shows an integrated circuit 100 comprising a resource manager 102 configured to arbitrate among a plurality of resource requesters to consume a resource in a fair manner based on a modified DWRR algorithm, according to some embodiments.

The resource manager 102 may be configured to provide fairness in arbitrating the requests from a plurality of resource requesters to consume a resource to perform a task. The plurality of resource requesters may include N resource requesters comprising a first resource requester 104a, a second resource requester 104b, and an Nth resource requester 104n. Note that in various instances, different sets of resource requesters from the N resource requesters 104a-

104*n* may request to consume the resource; however, for ease of discussion, the N resource requesters 104*a*-104*n* will be used herein. Consuming a resource to perform a task may include, for example, using a data path to transmit data to a resource provider 108. However, only one of the N resource requesters 104*a*-104*n* may be selected at a time to consume the resource. For example, there may be a single datapath available to transmit the data to the resource provider 108, or the resource provider 108 may only be capable to process the data from one of the N resource requesters 104*a*-104*n* at a time.

The resource manager 102 may include an arbiter (not shown in FIG. 1) to arbitrate among the N resource requesters 104*a*-104*n* in each selection round based on any suitable scheduling algorithm such as round-robin, or first-come first-served, among others. In some embodiments, the resource manager 102 may allocate a resource budget to each of the N resource requesters 104*a*-104*n*, and keep track of the amount of resource budget consumed by each resource requester. The arbiter may perform one or more selection rounds by going around each of the N resource requesters 104*a*-104*n* until all the N resource requesters 104*a*-104*n* have become ineligible to consume the resource in that round of budget allocation after performing their respective tasks. Once all the N resource requesters 104*a*-104*n* have finished consuming the resource to perform a task in a current round of budget allocation, additional resource budget can be allocated to each of the N resource requesters 104*a*-104*n* for a next round of budget allocation.

In each round of budget allocation, the resource manager 102 may determine which of the N resource requesters 104*a*-104*n* are eligible to consume the resource based on whether the resource budget of the corresponding resource requester is above a threshold. For ease of simplicity, the threshold can be set to 0; however, other values or data types are possible based on the implementation. When an eligible resource requester is selected to consume the resource, the corresponding resource budget can be decremented by the amount of resource consumed by the resource requester based on a resource consumption rate per cycle. For example, the resource consumption rate per cycle can be the number of bytes transmitted by a network port in each cycle. When an eligible resource requester finishes consuming the resource in a current selection round, the next eligible resource requester can be selected in a round-robin manner. Once the current selection round is finished, the arbiter may go around the eligible resource requesters again in the round-robin manner for a next round of selection until all the resource requesters become ineligible for selection. Once all the eligible resource requesters become ineligible after one or more selection rounds in the current round of budget allocation, the corresponding resource budget for each of the N resource requesters 104*a*-104*n* can be incremented for the next round of budget allocation. The resource manager 102 may further determine which of the N resource requesters 104*a*-104*n* are eligible to consume the resource in the next round of budget allocation based on whether the incremented resource budget of the corresponding resource requester is above the eligibility threshold. In various implementations, the threshold that is used to determine the eligibility can be different for different resource requesters or for different rounds of budget allocation.

In some implementations, a respective budget counter can be used for each of the N resource requesters 104*a*-104*n* to keep track of the amount of resource consumed by each resource requester. As an example, a first budget counter 106*a* may be initialized with a first resource budget for the first resource requester 104*a*, a second budget counter 106*b* may be initialized with a second resource budget for the second resource requester 104*b*, and an Nth budget counter 106*n* may be initialized with an Nth resource budget for the Nth resource requester 104*n*. The first resource budget, the second resource budget, and the Nth resource budget can be the same or different.

When the first resource requester 104*a* is selected to consume the resource, the first budget counter 106*a* can be decremented by the amount of resource consumed in each cycle to perform the task based on the resource consumption rate. When the first resource requester 104*a* is done consuming the resource in the current selection round, the arbiter may select the second resource requester 104*b* to consume the resource next, and the second budget counter 106*b* can be decremented by the amount of resource consumed in each cycle to perform the task based on the resource consumption rate. Once the Nth resource requester 104*n* is selected to consume the resource, and the Nth budget counter 106*n* is decremented by the amount of resource consumed in each cycle to perform the task based on the resource consumption rate, one selection round is over, and the arbiter can go around again in a round-robin manner in the next selection round to select the resource requesters with sufficient resource budget left to consume the resource again. Alternatively, the arbiter can go around each resource requester in a single selection round to select one resource requester at a time to consume the resource to perform the task until it has used up its resource budget in the current round of budget allocation. Once all the N resource requesters 104*a*-104*n* have used up their resource budgets in this round of budget allocation, the corresponding N budget counters 106*a*-106*n* can be incremented with the new resource budget for the next round of budget allocation.

In some instances, the classic DWRR algorithm may not provide fairness in consumption of the resource by different resource requesters. For example, in some cases, the first resource requester 104*a* may be slow and may take longer to consume the resource to perform the task as compared to the second resource requester 104*b*. In some cases, the first resource requester 104*a* may be idle for a certain number of cycles while occupying the transmission data path without any data transfer. In this case, the resource manager 102 may not be able to make another selection until the first resource requester 104*a* has completed consuming the resource for the current task and has released the data path, which can cause distortion in the arbitration and make the classic DWWR algorithm unfair.

As an example, each of the N resource requesters 104*a*-104*n* may represent a respective network port that is configured to transmit a packet, and the resource provider 108 may be a packet processor comprising a single packet processing pipeline (PPP) to process the packets received by the network ports. The same amount of bandwidth may be allocated to all the network ports for transmission to the PPP. If the first resource requester 104*a* does not have an entire packet available for transmission, bubbles will be introduced in the data path to the PPP while the first resource requester 104*a* waits for the remaining packet to arrive. However, the resource manager 102 cannot change the selection to another port until the first resource requester 104*a* completes transmitting the entire packet to the PPP. Thus, the first resource requester 104*a* may consume more bandwidth as compared to the other ports, which can cause inequities in the resource consumption since the bubble cycles may not accounted for by the classis DWRR algorithm when tracking the bandwidth consumption.

In another example, the first resource requester 104a can be a 1 GB port and the second resource requester 104b can be a 100 GB port. If both the first resource requester 104a and the second resource requester 104b are configured to transmit 1 KB of packet, the first resource requester 104a may take 100 times more cycles effectively than the second resource requester 104b to transmit the same amount of data. In some cases, while the first resource requester 104a is transmitting the packet at a slower pace, buffers in the second resource requester 104b may start filling up, which may eventually result in packet loss. Some systems may perform store and forward to solve the problem of bubbles during the transmission. For example, each resource requester may store the packet completely in the buffer before sending to arbitration to avoid waiting for the complete packet. However, the store and forward can introduce additional latency in the data path.

In some embodiments, a modified DWRR algorithm can be used to provide fairness in the bandwidth distribution by accounting for the wasted bandwidth by a port in addition to its consumed bandwidth. For example, the resource budget of the first resource requester 104a can be further reduced in the current round of budget allocation to compensate for the wasted bandwidth by further decrementing the first budget counter 106a for the number of cycles the first resource requester 104a is idle while being selected based on the resource consumption rate. Thus, in this case, once the first resource requester 104a has finished consuming the resource in the current round of budget of allocation, the first budget counter 106a may have a value at or below the threshold (e.g., if the threshold is 0, the budget counter 106a may reach 0 or become a negative value, which may make the first resource requester 104a ineligible for further selection in the current round of budget allocation based on the first budget counter 106a being below the threshold (e.g., value of 0) at completion of consuming the resource during the current selection. The resource manager 102 can now select another resource requester from the remaining eligible resource requesters in a round-robin manner until all the requesting resource requesters have become ineligible in the current round of budget allocation.

In some implementations, once each of the N resource requesters 104a-104n becomes ineligible to consume the resource in the current round of budget allocation, the corresponding budget counters 106a-106n can be incremented by their respective resource budgets for a next round of budget allocation. The resource manager 102 can determine which of the N resource requesters 104a-104n are eligible for selection in the next round of budget allocation based on the incremented value of their corresponding budget counters. In some examples, after the first budget counter 106a has been incremented by the resource budget in the next round of budget allocation, the first budget counter 106a may still be below the threshold, and therefore, the first resource requester 104a may remain ineligible for selection in the next round of budget allocation. However, the first resource requester 104a may be able to accumulate sufficient data during the next round of budget allocation, while the other resource requesters are consuming the resource, such that incrementing the first budget counter 106a by the resource budget for a subsequent round of budget allocation can raise the first budget counter 106a above the threshold and make the first resource requester 104a eligible for selection in the subsequent round of budget allocation.

In the subsequent round of budget allocation, the first resource requester 104a, when selected, can consume the resource to perform the task more efficiently (e.g., at a faster pace), and therefore, the overall consumption of the resource by the first resource requester 104a over a few rounds of budget allocation may be balanced as compared to the classic DWRR approach. In this manner, the slow resource requesters can accumulate data in the rounds of budget allocation they are ineligible for selection. Thus, the system can reach an equilibrium where all the slow resource requesters may have to store a portion of the packet that is large enough so that the wasted cycles can be minimized. In some cases, it may take multiple consecutive rounds of budget allocation for all the resource requesters to be eligible for selection if their corresponding budget deficit was high.

In some examples, the N resource requesters 104a-104n can include different components of a system-on-a-chip (SoC), and the resource provider 108 can be a memory that is shared between the N resource requesters 104a-104n. As an example, the N resource requesters 104a-104n may include processors, direct memory access (DMA) controllers, micro-controllers, or accelerators, among others. In some cases, a component may be selected to access the shared memory; however, the component may not have all the information related to access the memory while being selected, and may hold the shared bus contributing to idle cycles. Some embodiments can be used to penalize the slow component by reducing the allocated resource budget to compensate for the idle cycles.

In another example, the N resource requesters 104a-104n may include multiple SoCs that may need to communicate with one another using a single transaction medium (e.g., a message or a bus). In some cases, an SoC may be selected to use the shared transaction medium; however, the selected SoC may not be ready to fully utilize the transaction medium, which can hang the system while waiting for the selected SoC to release the transaction medium. Some embodiments can be used to penalize the slow SoC by reducing the allocated resource budget to compensate for the idle cycles.

Figure 2:
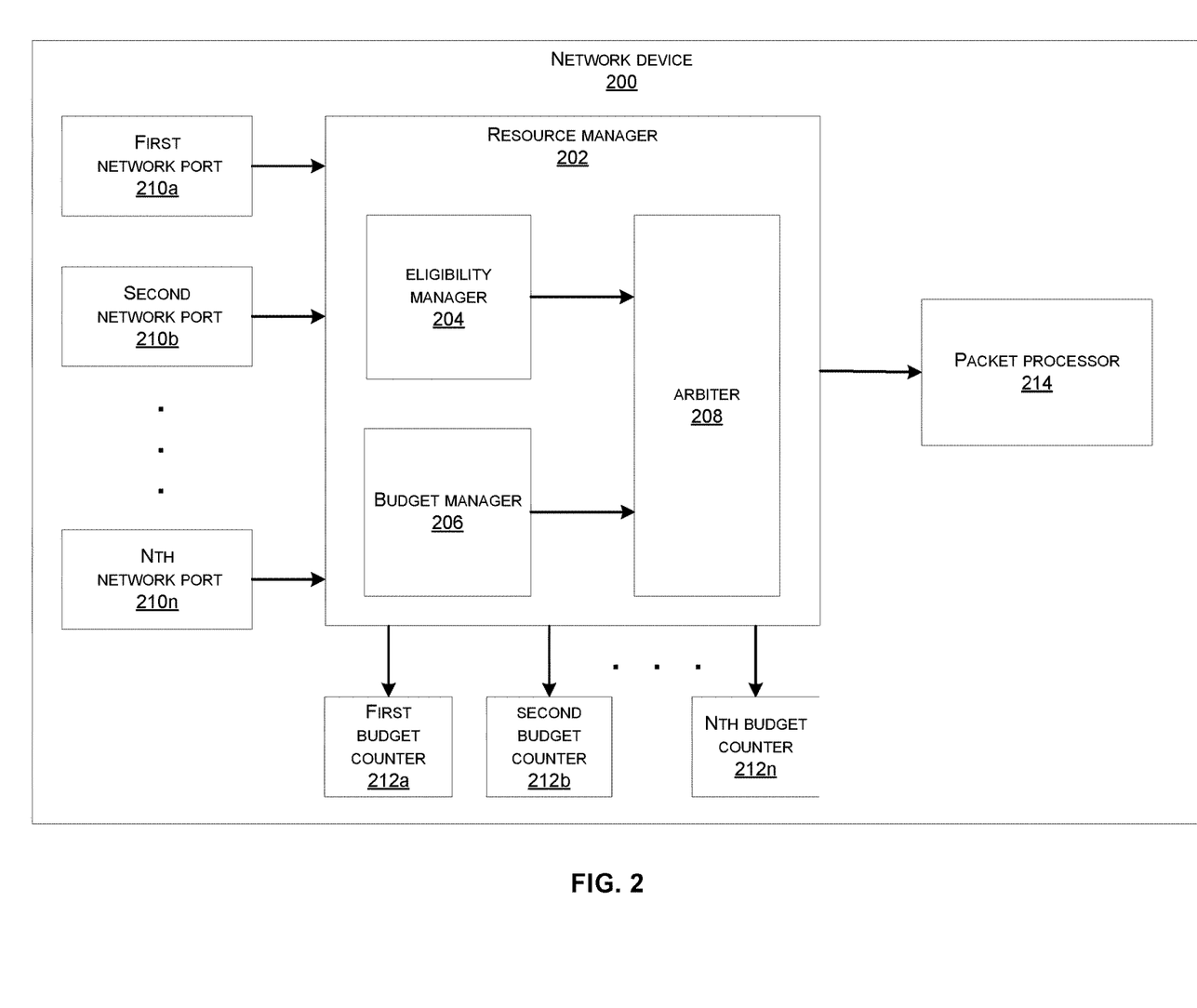
FIG. 2 shows a network device comprising a resource manager configured to arbitrate among a plurality of network ports to transmit a packet to a packet processor based on the modified DWRR algorithm, according to some embodiments.

FIG. 2 shows a network device 200 comprising a resource manager 202 configured to arbitrate among a plurality of network ports to transmit a packet to a packet processor based on a modified DWRR algorithm. In some embodiments, the network device 200 can be an example of the integrated circuit 100 in FIG. 1.

The network device 200 may include a resource manager 202, which may be configured to receive requests from N network ports comprising a first network port 210a, a second network port 210b, and an Nth network port 210n to transmit one or more packets to a packet processor 214. Each of the N network ports 210a-210n may include an Ethernet port, a local area network (LAN) port, or another suitable network port which may be configured to provide a network connection. In some examples, each of the N network ports 210a-210n may be configured to receive packets from different remote computers via the network connection. Each of the N network ports 210a-210n may include transceivers, Serializer/De-serializer (SerDes), buffers, or other suitable components based on the implementation. Each of the N network ports 210a-210n may be configured to send a request to the resource manager 202 to transmit one or more packets to the packet processor 214. The packet processor 214 can be an example of the resource provider 108 in FIG. 1. The packet processor 214 may be configured to serve one of the N network ports 210a-210n at a time. As an example, the packet processor 214 may include a single packet processing pipeline (PPP) to process the packet received from one of the N network ports 210a-210n.

The network device 200 may further comprise a plurality of budget counters corresponding to the plurality of network ports. As an example, a first budget counter 212a may correspond to the first network port 210a, a second budget counter 212b may correspond to the second network port 210b, and an Nth budget counter 212n may correspond to the Nth network port 210n. Each of the N budget counters 212a-212n may be initialized with a respective byte count budget for a corresponding network port. The byte count budget for each network port may be the same or different, and in some cases may depend upon a respective transmission rate of each port. For example, a fast port may be allocated a higher byte count budget in comparison to a slow port. In some examples, each network port from a set of network ports in the N network ports 210a-210n may transmit one or more packets in each round of selection, and multiple rounds of selection can be performed in each round of budget allocation in a round-robin manner based on the allocated byte count budget of each network port. For example, the set of the network ports may send respective requests to the resource manager 202 for transmitting the corresponding packets while the remaining network ports in the N network ports 210a-210n may not compete for using the transmission data path to the packet processor 214.

In various implementations, the N budget counters 212a-212n may be initialized in a first round of budget allocation, or at reset. The byte count budget for a network port may indicate the number of bytes that the port can transmit in that round of budget allocation. Furthermore, each of the N budget counters 212a-212n can be incremented by an additional byte count budget for each round of budget allocation. Allocation of the additional byte count budget can be performed at the same time, e.g., once all the ports become ineligible for selection in the current round of budget allocation.

The resource manager 202 may comprise an eligibility manager 204, a budget manager 206, and an arbiter 208. The eligibility manager 204 may be configured to determine which requesting network ports from the N network ports 210a-210n are eligible for transmitting a packet to the packet processor 214 based on whether the byte count budget of the corresponding network port is above a threshold when a request to transmit the packet is received from the corresponding network port. The threshold can be 0; however, other values are possible based on the implementation. The arbiter 208 may be configured to select a requesting network port from the N network ports 210a-210n for transmitting a packet to the packet processor 214 based on a round-robin algorithm and which of the requesting network ports are eligible in a current round of budget allocation. The budget manager 206 may be configured to manage the N budget counters 212a-212n. The resource manager 202 may include state machines, registers, microcontrollers, or other suitable components in various embodiments based on the implementation.

The budget manager 206 may be further configured to decrement each of the N budget counters 212a-212n by a number of bytes in each cycle that the corresponding network port transmits to the packet processor 214, when selected by the arbiter 208. In some cases, a network port that has been selected to transmit a packet can be slow. For example, the selected network port may not have the complete packet available for transmission, or the speed of transmitting the data may be much lower than the speed of processing the data by the packet processor 214. Thus, the selected network port may be idle for a number of cycles while waiting for the data to be available for transmission. The budget manager 206 may be further configured to determine the number of cycles that the selected network port is idle while waiting for the data to be available for transmission after starting to transmit a packet and before completing transmission of the packet.

The budget manager 206 may also be configured to further decrement the corresponding budget counter by the number of bytes in each cycle for the number of cycles that the network port is idle while being selected for transmitting the packet. Thus, further decrementing the corresponding budget counter may account for the wasted bandwidth corresponding to the idle cycles, and can make that port ineligible for further selection in the current round once it completes transmitting the packet. The corresponding budget counter for each network port can be incremented by the byte count budget for the next round of budget allocation once all the requesting network ports become ineligible for selection by the arbiter 208 in the current round of budget allocation. In some cases, the incremented budget counter for a network port may still be below the threshold, and therefore, the corresponding network port may remain ineligible for selection in the next one or two rounds of budget allocation. This is further explained with an example in FIG. 3.

Figure 3:
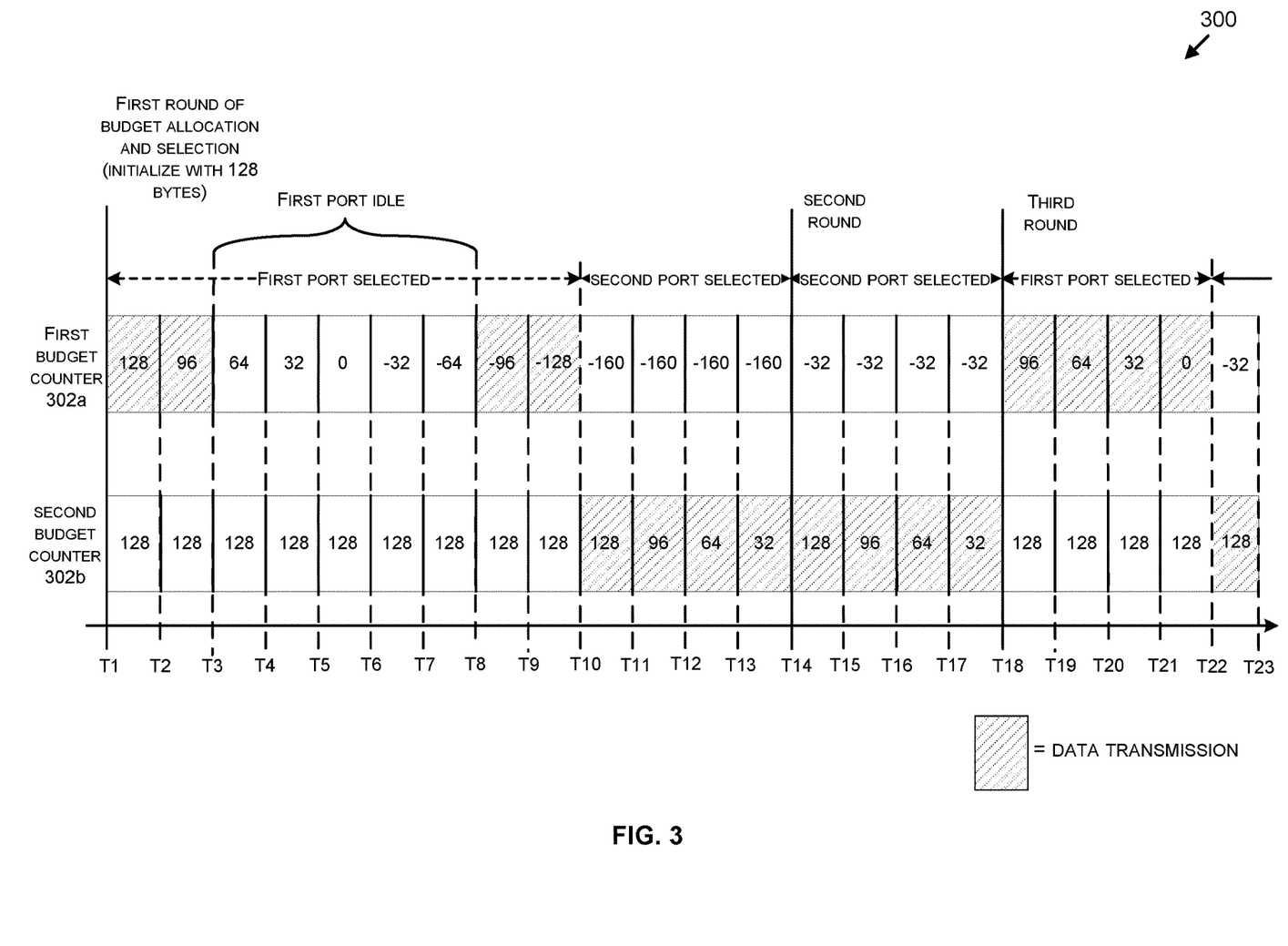
FIG. 3 shows an example timeline for a first budget counter and a second budget counter with budget allocation performed after all the ports become ineligible for selection in a current round of budget allocation, according to some embodiments.

FIG. 3 shows an example timeline 300 for a first budget counter 302a and a second budget counter 302b with budget allocation performed after all the ports become ineligible for selection in the current round of budget allocation, according to some embodiments. As an example, the first budget counter 302a can be an example of the first budget counter 212a and the second budget counter 302b can be an example of the second budget counter 212b. Note that FIG. 3 is described using two network ports for ease of explanation, but it will be understood that the description can be extended to more than two network ports within the scope of the disclosure.

As shown in FIG. 3, the first budget counter 302a and the second budget counter 302b can be initialized with a byte count budget of 128 bytes at time T1. In some examples, the first budget counter 302a and the second budget counter 302b may be initialized with the byte count budget of 128 bytes by the budget manager 206 in a first round of budget allocation. The first network port 210a may send a request to the resource manager 202 to transmit a first packet to the packet processor 214 and the second network port 210b may send a request to the resource manager 202 to transmit a second packet to the packet processor 214. For example, the first packet may include 128 bytes and the second packet may include 128 bytes. The eligibility manager 204 may determine that both the first network port 210a and the second network port 210b are both eligible for transmitting the first packet and the second packet, respectively, to the packet processor 214 based on each of the first budget counter 302a and the second budget counter 302b being above the threshold value of 0.

The arbiter 208 may select the first network port 210a to transmit the first packet based on a round-robin algorithm in the first round of selection. As an example, each of the first network port 210a and the second network port 210b may be configured to transmit 32 bytes per cycle when transmitting a packet. If the first network port 210a is selected to transmit the first packet at time T1, the first network port 210a may transmit 32 bytes of the first packet in the first cycle, and the first budget counter 302a may be decremented by the budget manager 206 to 96 bytes at time T2. The first network port 210a may transmit another 32 bytes of the first packet in the second cycle, and the first budget counter 302a may be further decremented by the budget manager 206 to 64 bytes at time T3. However, the first network port 210a may only have 64 bytes of the first packet available for transmission thus far, and therefore, the first network port 210a may be idle (or not transmitting any data while occupying the transmission data path) for a number of cycles until the remaining 64 bytes of the first packet are available for transmission.

As an example, the first network port 210a may remain idle for 5 cycles while selected in the first round. However, according to the modified DWRR algorithm in some embodiments, the first budget counter 302a may keep getting decremented by 32 bytes in each cycle the first network port 210a is idle. As shown in FIG. 3, the first budget counter 302a may be further decremented by the budget manager 206 to 32 bytes at time T4, 0 bytes at time T5, −32 bytes at time T6, −64 bytes at time T7, and −96 bytes at time T8. The first network port 210a may receive the remaining 64 bytes of the first packet at this time, and transmit another 32 bytes at time T8, and the last 32 bytes at time T9. Thus, the first budget counter 302a may be further decremented to −128 bytes at the time T9 after transmitting 32 bytes, and then to −160 bytes initially at time T10 after transmitting the next 32 bytes. At the end of transmitting the first packet, the first budget counter 302a may be below the threshold and therefore ineligible for further selection to transmit another packet in the first round of budget allocation. The second budget counter 302b may remain at 128 bytes from T1-T10 since the second network port 210b has not been selected yet.

The arbiter 208 may next select the second network port 210b in the first round of selection once the first network port 210a has transmitted the complete first packet and becomes ineligible for transmission. The second network port 210b may have the complete second packet available for transmission, and transmit 32 bytes in each cycle until the complete second packet has been transmitted. As shown in FIG. 3, the budget manager 206 may decrement the second budget counter 302b to 96 bytes at time T11, to 64 bytes at time T12, to 32 bytes at time T13, and to 0 bytes initially at time T14. Once the second network port 210b has finished transmitting the second packet, it becomes ineligible to transmit another packet in the first round of budget allocation. If there were additional network ports competing to transmit a packet, another network port can be selected in a round-robin manner. Once all the network ports become ineligible in the first round of budget allocation, new budget may be allocated for a second round of budget allocation at T14. For example, each of the first budget counter 302a and the second budget counter 302b may be incremented by another 128 bytes of the byte count budget for the second round of budget allocation. Thus, the first budget counter 302a may be incremented to −160 bytes+128 bytes=−32 bytes, and the second budget counter 302b may be incremented to 0 bytes+128 bytes=128 bytes at time T14.

At time T14, all network ports have had their budget reallocated. The arbiter 208 may arbitrate again between the first network port 210a and the second network port 210b in the second budget allocation round. Since the first budget counter 302a is still below the threshold, the first network port 210a may be ineligible in this round to transmit another packet, and the second network port 210b may be selected again to transmit a third packet. As shown in FIG. 3, the budget manager 206 may further decrement the second budget counter 302b to 96 bytes at time T15, to 64 bytes at time T16, to 32 bytes at time T17, and to 0 bytes initially at time T18. Once the second network port 210b has finished transmitting the third packet, it may become ineligible to transmit another packet in the second round of budget allocation.

Since all eligible ports (only the second network port 210b here) in the second budget allocation round have exhausted their budget for the second round, new budget may be allocated for a third round of budget allocation at T18. For example, each of the first budget counter 302a and the second budget counter 302b may be incremented by another 128 bytes of the byte count budget for use in the third round of budget allocation. Thus, the first budget counter 302a may be incremented to −32 bytes+128 bytes=96 bytes, and the second budget counter 302b may be incremented to 0 bytes+128 bytes=128 bytes at time T18. During T15-T18, while the first network port 210a is ineligible for selection in this budget allocation round, the first network port 210a can accumulate enough data for a fourth packet so that the first network port 210a has sufficient data to transmit the packet without bubbles when the first network port 210a becomes eligible for transmission in a subsequent round.

At time T18, all network ports have had their budget reallocated. Since the first budget counter 302a is above the threshold in this round, the first network port 210a may be eligible in this round to transmit another packet. The arbiter 208 may arbitrate again between the first network port 210a and the second network port 210b and select the first network port 210a to transmit the fourth packet. As shown in FIG. 3, the budget manager 206 may further decrement the first budget counter 302a to 64 bytes at time T19, to 32 bytes at time T20, to 0 bytes at time T21, and then to −32 bytes at time T22. Once the first network port 210a has finished transmitting the fourth packet, it may become ineligible to transmit another packet in the third round of budget allocation, and arbiter 208 may select the second network port 210b to transmit a fifth packet to the packet processor 214 at time T22. As shown in FIG. 3, the budget manager 206 may further decrement the second budget counter 302b to 96 bytes at time T23 and so on. Once the second network port 210b has finished transmitting the fifth packet, it may become ineligible to transmit another packet in the third round of budget allocation. Once all eligible ports in the third budget allocation round have exhausted their budget for the third round, new budget may be allocated for a fourth round of budget allocation (not shown).

Thus, by penalizing the first network port 210a for the idle cycles during the first round of selection, and allowing the second network port 210b to transmit in the cut-through mode during the second round of selection, the overall bandwidth consumption of the first network port 210 and the second network port 210b can be balanced in a fair manner over the four rounds of budget allocation.

Figure 4:
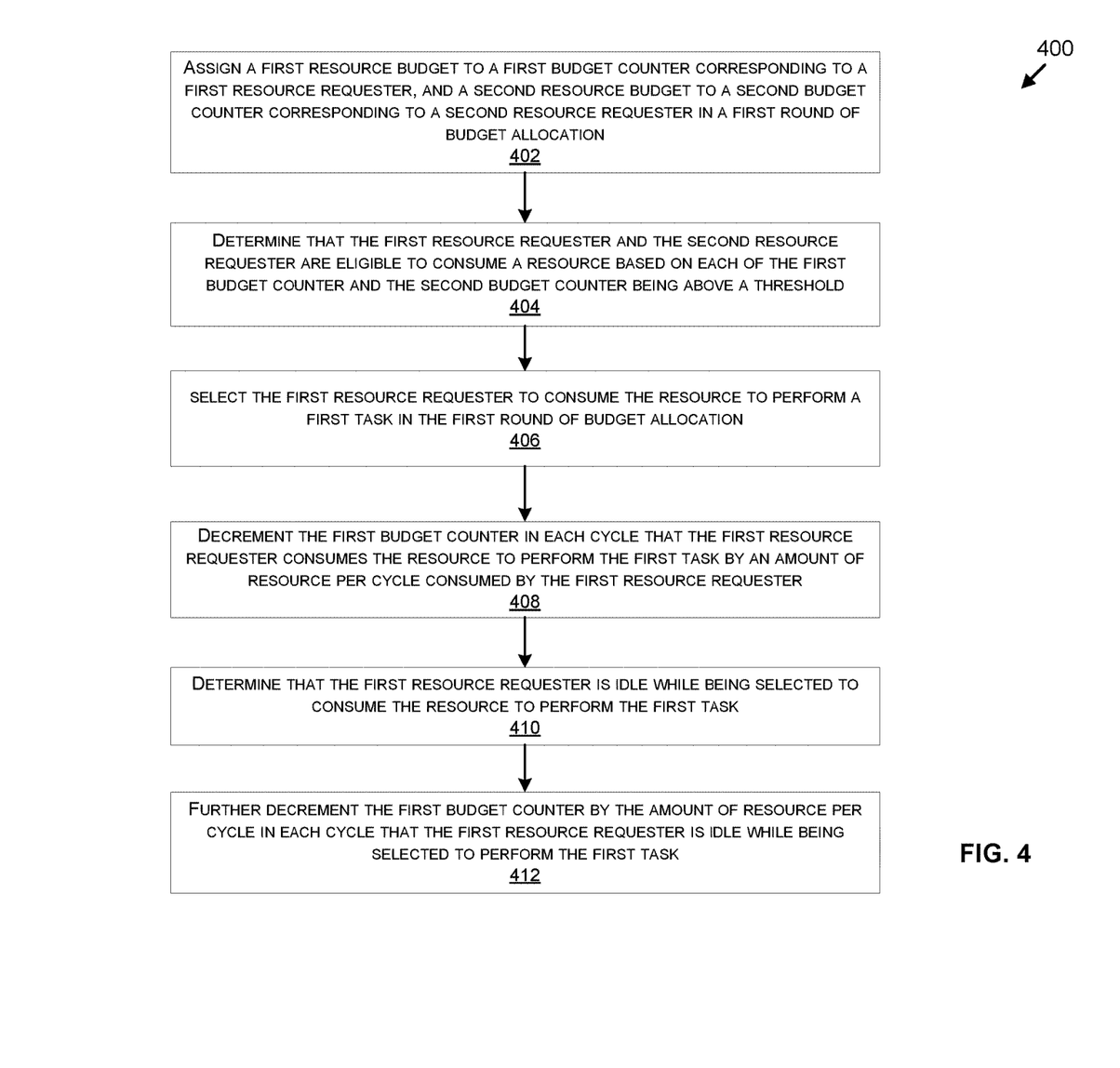
FIG. 4 shows an example flowchart for a method performed by an integrated circuit for penalty-based arbitration among two resource requesters, according to some embodiments.

FIG. 4 shows an example flowchart 400 for a method performed by an integrated circuit for penalty-based arbitration among two resource requesters, according to some embodiments. In some embodiments, the method may be performed by the network device 200, which can be an example of the integrated circuit 100. It should be understood that although flowchart 400 is described using two resource requesters for ease of explanation, the penalty-based arbitration can be performed for more than two resource requesters.

In step 402, the method may include assigning a first resource budget to a first budget counter corresponding to a first resource requester, and a second resource budget to a second budget counter corresponding to a second resource requester in a first round of budget allocation. As an example, the first resource requester can be the first network port 210a and the second resource requester can be the second network port 210b. The budget manager 206 may initialize the first budget counter 302a with the first resource budget and the second budget counter 302b with the second resource budget in the first round of budget allocation. For example, the first resource budget and the second resource budget can be 128 bytes each. As discussed with reference to FIG. 3, the first round of budget allocation can be performed at time T1.

In step 404, the method may further include determining that the first resource requester and the second resource requester are eligible to consume a resource based on each of the first budget counter and the second budget counter being above a threshold. The eligibility manager 204 may determine that the first network port 210a and the second network port 210b are eligible for transmission to the packet processor 214 based on the first budget counter 302a and the second budget counter 302b being above the threshold (e.g., 0).

In step 406, the method may include selecting the first resource requester to consume the resource to perform a first task in the first round of budget allocation. The arbiter 208 may select the first network port 210a to transmit the first packet in the first round of budget allocation based on a round-robin algorithm. As an example, size of the first packet can be 128 bytes.

In step 408, the method may include decrementing the first budget counter in each cycle that the first resource requester consumes the resource to perform the first task by an amount of resource per cycle consumed by the first resource requester. As an example, the amount of resource per cycle consumed by the first network port 210a (or the resource consumption rate per cycle) can be 32 bytes. Thus, the budget manager 206 may decrement the first budget counter 302a by 32 bytes in each cycle the first network port 210a transmits the first packet. As discussed with reference to FIG. 3, the first network port 210a may only have first 64 bytes of the first packet available, and transmit the first 64 bytes of the first packet over 2 cycles. Thus, the first budget counter 302a may be decremented to 64 bytes at T3 after 2 cycles of transmission.

In step 410, the method may include determining that the first resource requester is idle while being selected to consume the resource to perform the first task. For example, the budget manager 206 may determine that the first network port 210a is idle while being selected to transmit the first packet to the packet processor 214. As discussed previously, the first network port 210a may be waiting to receive the remaining 64 bytes of the first packet for transmission.

In step 412, the method may include further decrementing the first budget counter by the amount of resource per cycle in each cycle that the first resource requester is idle while being selected to perform the first task. Thus, the first budget counter 302a may be further decremented by 32 bytes in each cycle that the first network port 210a is idle. As discussed with reference to FIG. 3, the first budget counter 302a may be decremented for 5 cycles to −96 bytes. The first network port 210a may receive the remaining 64 bytes of the first packet and transmit to the packet processor 214 over next 2 cycles. Thus, the first budget counter 302a may be further decremented for 2 cycles to −160 bytes.

The method may further include determining that the first resource requester has finished performing the first task and selecting the second resource requester to consume the resource to perform a second task in the first round of budget allocation. The eligibility manager 204 may determine that the first network port 210a has finished transmitting the first packet at T10, and the arbiter 208 may select the second network port 210b to transmit the second packet at T10.

The method may further include determining that the first budget counter has fallen below the threshold in the first round of budget allocation, and determining that the first resource requester is no longer eligible for selection in the first round of budget allocation. The eligibility manager 204 may determine that the first budget counter 302a is below the threshold and therefore the first network port 210a is no longer eligible for selection in the first round of budget allocation. As discussed with reference to FIG. 3, the eligibility manager 204 may select the second network port 210b for transmitting the second packet to the packet processor 214. After transmitting the second packet at T14, the eligibility manager 204 may determine that the second network port 210b is no longer eligible for selection in the first round of budget allocation.

The method may further include incrementing the budget counters by their respective resource budgets for a next round of budget allocation once every resource requester becomes ineligible to consume the resource in the current round of budget allocation. Thus, once the first network port 210a and the second network port 210b become ineligible to transmit additional packets in the first round of budget allocation, the budget manager 206 may increment the first budget counter 302a and the second budget counter 302b for the second round of budget allocation. As discussed with reference to FIG. 3, the first budget counter 302a and the second budget counter 302b may be incremented by another 128 bytes to −32 bytes and 128 bytes, respectively, at the time T14.

The method may further include determining that the first budget counter is still below the threshold after being incremented by the first resource budget for the second round of budget allocation and determining that the first resource requester is not eligible for the selection in the second round of budget allocation. The eligibility manager 204 may determine that the first budget counter 302a is still below the threshold for the second round of selection at T14 and the arbiter 208 may select the second network port 210b again.

In some examples, the first resource requester can become eligible in a subsequent round of budget allocation if incrementing the first budget counter for that subsequent round of budget allocation raises the first budget counter above the threshold. The budget manager 206 may further increment the first budget counter 302a by 128 bytes at T18 to 96 bytes for the third round of budget allocation. The eligibility manager 204 may further determine that the first network port 210a is eligible in the third round of budget allocation to transmit another packet. Thus, the bandwidth consumption between the first network port 210a and the second network port 210b can be balanced over multiple rounds.

Thus, some embodiments can be used to provide fairness in consumption of the bandwidth by different ports irrespective of their corresponding transmission speeds based on a modified DWRR algorithm. Note that the method described with reference to FIG. 4 can be extended to multiple network ports, or multiple resource requesters which are competing for a service but do not use the service in a fair manner.

Figure 5:
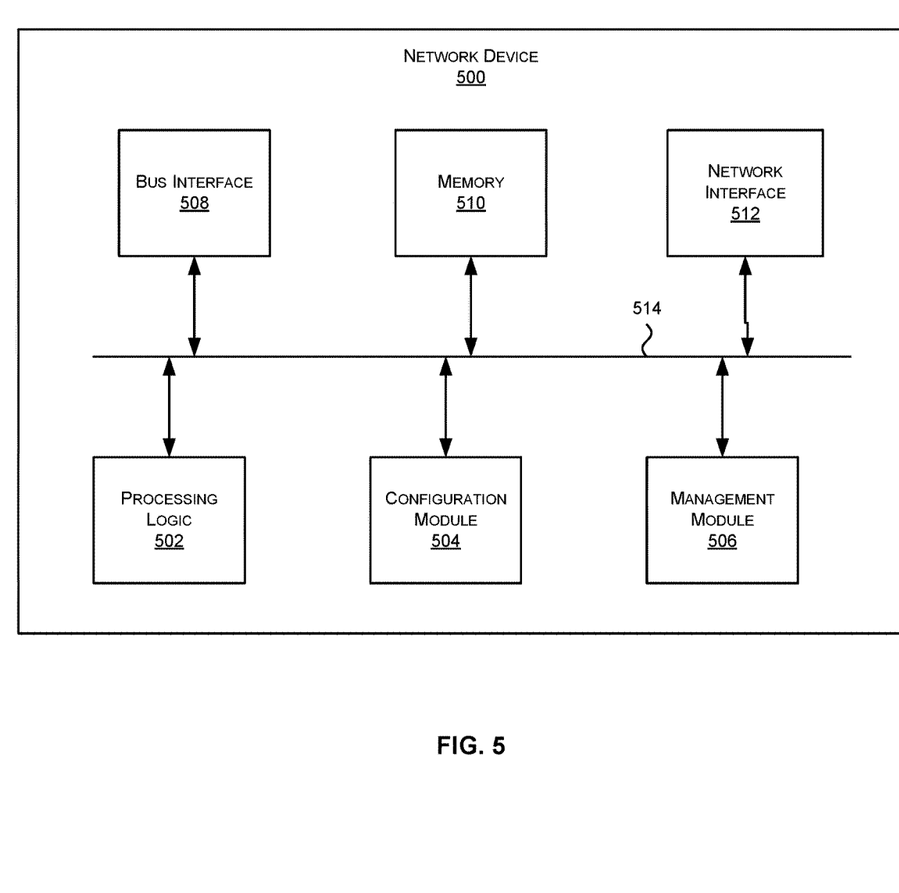
FIG. 5 illustrates an example of a network device, according to certain aspects of the disclosure.

FIG. 5 illustrates an example of a network device 500. Functionality and/or several components of the network device 500 may be used without limitation with other embodiments disclosed elsewhere in this disclosure, without limitations. In some embodiments, the network device 500 can be an example of the integrated circuit 100 of FIG. 1. A network device 500 may facilitate processing of packets and/or forwarding of packets from the network device 500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 500 may be the recipient and/or generator of packets. In some implementations, the network device 500 may modify the contents of the packet before forwarding the packet to another device. The network device 500 may be a peripheral device coupled to another computer device, a switch, a router or any other suitable device enabled for receiving and forwarding packets.

In one example, the network device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The network device 500 may include additional modules, which are not illustrated here. In some implementations, the network device 500 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the network device 500, while in other cases some or all of the memory may be external to the network device 500. The memory 510 may store an operating system comprising executable instructions that, when executed by the processing logic 502, provides the execution environment for executing instructions providing networking functionality for the network device 500. The memory may also store and maintain several data structures and routing tables for facilitating the functionality of the network device 500.

In some implementations, the configuration module 504 may include one or more configuration registers. Configuration registers may control the operations of the network device 500. In some implementations, one or more bits in the configuration register can represent certain capabilities of the network device 500. Configuration registers may be programmed by instructions executing in the processing logic 502, and/or by an external entity, such as a host device, an operating system executing on a host device, and/or a remote device. The configuration module 504 may further include hardware and/or software that control the operations of the network device 500.

In some implementations, the management module 506 may be configured to manage different components of the network device 500. In some cases, the management module 506 may configure one or more bits in one or more configuration registers at power up, to enable or disable certain capabilities of the network device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the network device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 500 may include multiple network interface modules, each configured to communicate with a different network. For example, in these implementations, the network device 500 may include a network interface module for communicating with a wired Ethernet network, a wireless 802.11 network, a cellular network, an Infiniband network, etc.

The various components and modules of the network device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device, comprising:
a plurality of network ports configured to send requests to transmit packets to a packet processor;
a plurality of budget counters corresponding to the plurality of network ports, each budget counter initialized with a byte count budget for a corresponding network port;
an eligibility manager configured to determine which requesting network ports are eligible for transmitting a packet to the packet processor based on whether the byte count budget of the corresponding network port is above a threshold;
an arbiter configured to select a requesting network port from the plurality of network ports for transmitting a packet to the packet processor based on a round-robin algorithm and which of the requesting network ports are eligible in a current round of budget allocation; and
a budget manager configured to, for each of the budget counters:
decrement the budget counter by a number of bytes in each cycle that the corresponding network port transmits to the packet processor;
determine a number of cycles that the corresponding network port is idle while waiting for data to be available for transmission after starting to transmit a packet and before completing transmission of the packet; and further decrement the budget counter by the number of bytes in each cycle for the number of cycles that the corresponding network port is idle while being selected for transmitting the packet.

2. The network device of claim 1, wherein the eligibility manager is further configured to:

determine that a selected network port is not eligible for further selection by the arbiter in the current round of budget allocation once the budget counter corresponding to the network port is less than the threshold at completion of transmitting a packet.

3. The network device of claim 2, wherein the budget manager is further configured to, for each of the budget counters:

increment the budget counter by the byte count budget for a next round of budget allocation once all the requesting network ports are not eligible for the selection by the arbiter in the current round of budget allocation.

4. The network device of claim 3, wherein a network port remains ineligible for selection in the next round of budget allocation when the budget counter for the network port is below the threshold after being incremented for the next round of budget allocation.

5. An integrated circuit, comprising:

a plurality of resource requesters;

a plurality of budget counters corresponding to the plurality of resource requesters, each budget counter initialized with a resource budget for a corresponding resource requester; and a resource manager configured to:

determine which of the resource requesters are eligible to consume a resource based on whether the resource budget of the corresponding resource requester is above a threshold;

select a resource requester from the plurality of resource requesters to consume the resource based on which of the resource requesters are eligible in a current round of budget allocation; and for each of the budget counters:

decrement the budget counter by an amount of resource the corresponding resource requester consumes based on a resource consumption rate per cycle;

determine a number of cycles that the corresponding resource requester is idle while being selected to consume the resource; and further decrement the budget counter for the number of cycles that the corresponding resource requester is idle while being selected based on the resource consumption rate.

6. The integrated circuit of claim 5, wherein the resource manager is further configured to:

determine that a selected resource requester is no longer eligible for further selection to consume the resource in the current round of budget allocation if the corresponding budget counter falls below the threshold at completion of consuming the resource during a current selection.

7. The integrated circuit of claim 6, wherein the resource manager is further configured to:

increment the budget counters by their respective resource budgets for a next round of budget allocation once every resource requester becomes ineligible to consume the resource in the current round of budget allocation.

8. The integrated circuit of claim 7, wherein an ineligible resource requester remains ineligible for selection in the next round of budget allocation when the corresponding budget counter is below the threshold after being incremented with the resource budget for the next round of budget allocation.

9. The integrated circuit of claim 8, wherein the ineligible resource requester becomes eligible in a subsequent round of budget allocation when incrementing the corresponding budget counter for that subsequent round of budget allocation raises the budget counter above the threshold.

10. The integrated circuit of claim 5, wherein the resource manager is configured to select the resource requester from resource requesters that are determined to be eligible in a round robin manner.

11. The integrated circuit of claim 10, wherein the resource requester selected in the round-robin manner remains selected until the budget counter falls below the threshold.

12. The integrated circuit of claim 10, wherein the resource requester selected in the round-robin manner remains selected until a current task being performed by the resource requester is complete.

13. The integrated circuit of claim 5, wherein a resource budget allocated for a first resource requester is different than a resource budget allocated for a second resource requester in a same round of budget allocation.

14. The integrated circuit of claim 5, wherein a resource budget allocated for a resource requester in one round of budget allocation is different than a resource budget allocated for the resource requester in another round of budget allocation.

15. The integrated circuit of claim 5, wherein each of the plurality of resource requesters includes a network port, and the resource budget includes a total number of bytes allocated for a corresponding network port based on its transmission rate to transmit one or more packets to a packet processor in each round of budget allocation.

16. The integrated circuit of claim 15, wherein the resource manager is configured to perform network port selection after each complete packet has been transmitted to the packet processor.

17. A method performed by an integrated circuit, comprising:

assigning a first resource budget to a first budget counter corresponding to a first resource requester, and a second resource budget to a second budget counter corresponding to a second resource requester in a first round of budget allocation;

determining that the first resource requester and the second resource requester are eligible to consume a resource based on each of the first budget counter and the second budget counter being above a threshold;

selecting the first resource requester to consume the resource to perform a first task in the first round of budget allocation;

decrementing the first budget counter in each cycle that the first resource requester consumes the resource to perform the first task by an amount of resource per cycle consumed by the first resource requester;

determining that the first resource requester is idle while being selected to consume the resource to perform the first task; and further decrementing the first budget counter by the amount of resource per cycle in each cycle that the first resource requester is idle while being selected to perform the first task.

18. The method of claim 17, further comprising:

determining that the first resource requester has finished performing the first task; and selecting the second resource requester to consume the resource to perform a second task in the first round of budget allocation.

19. The method of claim 18, further comprising:

determining that the first budget counter has fallen below the threshold in the first round of budget allocation; and determining that the first resource requester is no longer eligible for selection in the first round of budget allocation.

20. The method of claim 19, further comprising:

determining that the second resource requester has finished performing the second task and is no longer eligible for selection in the first round of selection;

incrementing the first budget counter by the first resource budget and the second budget counter by the second resource budget for a second round of budget allocation;

determining that the first budget counter is still below the threshold after being incremented by the first resource budget for the second round of budget allocation; and determining that the first resource requester is not eligible for the selection in the second round of budget allocation.

21. The method of claim 20, wherein the first resource requester becomes eligible in a subsequent round of budget allocation when incrementing the first budget counter for that subsequent round of budget allocation raises the first budget counter above the threshold.

* * * * *